US008881608B2

(12) United States Patent
Tetsuka et al.

(10) Patent No.: US 8,881,608 B2
(45) Date of Patent: Nov. 11, 2014

(54) BICYCLE CRANK ARM

(75) Inventors: Toshio Tetsuka, Osaka (JP); Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 206 days.

(21) Appl. No.: 13/455,431

(22) Filed: Apr. 25, 2012

(65) Prior Publication Data

US 2013/0233092 A1 Sep. 12, 2013

Related U.S. Application Data

(63) Continuation-in-part of application No. 13/414,435, filed on Mar. 7, 2012.

(51) Int. Cl.
*G01L 1/04* (2006.01)
(52) U.S. Cl.
USPC ........................................ 73/862.621; 73/862
(58) Field of Classification Search
USPC ............................................. 73/862.621, 862
See application file for complete search history.

(56) References Cited

U.S. PATENT DOCUMENTS

| 5,027,303 | A  | * | 6/1991 | Witte .............................. 702/44 |
| 7,806,006 | B2 | * | 10/2010 | Phillips et al. ........... 73/862.338 |
| 7,861,599 | B2 | * | 1/2011 | Meggiolan ...................... 73/794 |
| 8,006,574 | B2 | * | 8/2011 | Meyer ...................... 73/862.627 |
| 8,065,926 | B2 | * | 11/2011 | Meyer ...................... 73/862.338 |
| 2005/0178210 | A1 | * | 8/2005 | Lanham .......................... 73/818 |
| 2009/0120210 | A1 | * | 5/2009 | Phillips et al. ........... 73/862.338 |
| 2010/0263468 | A1 | * | 10/2010 | Fisher et al. ..................... 74/469 |
| 2013/0233091 | A1 | * | 9/2013 | Tetsuka .................... 73/862.621 |

FOREIGN PATENT DOCUMENTS

| JP | 3047816 U | 2/1998 |
| WO | WO-2011/030215 A1 | 3/2011 |

\* cited by examiner

*Primary Examiner* — Lisa Caputo
*Assistant Examiner* — Jamel Williams
(74) *Attorney, Agent, or Firm* — Global IP Counselors, LLP

(57) ABSTRACT

A bicycle crank arm comprises a crank body, a sensor support member and a power sensing device. The crank body includes a crank axle mounting portion and a pedal mounting portion. The sensor support member is disposed in a cavity of the crank body and attached to the crank body. The power sensing device is supported on the sensor support member.

19 Claims, 13 Drawing Sheets

US 8,881,608 B2

BICYCLE CRANK ARM

CROSS-REFERENCE TO RELATED APPLICATIONS

This application is a continuation-in-part application of U.S. patent application Ser. No. 13/414,435 filed on Mar. 3, 2012. The entire disclosure of U.S. patent application Ser. No. 13/414,435 is hereby incorporated herein by reference.

BACKGROUND

1. Field of the Invention

This invention generally relates to a bicycle crank arm. More specifically, the present invention relates to a bicycle crank arm with a bicycle input force processing apparatus that detects a pedaling force.

2. Background Information

Bicycles are sometimes equipped with various sensors for providing information to the rider and/or for providing information to a controller to control various aspects of the bicycle such as shifting or suspension stiffness. One such sensor is a torque or force sensor for detecting a pedaling force of the rider. Various sensing arrangements have been proposed for detecting a pedaling force of the rider. For example, in U.S. Pat. No. 7,516,677 (assigned to Shimano Inc.), a cylindrical torsion-detecting sleeve member (force sensor unit) is provided on a crank axle for detecting a pedaling force applied to the crank axle during pedaling. Another example of a force sensor for detecting a pedaling force applied to a crank arm is disclosed in Japanese Utility Model Patent No. 3047816 (see FIGS. 3 and 4). In this utility model patent, a torque sensor is used to detect a relative resistance between a flexible rod and a crank arm. The crank arm and the flexible rod are rotatable around a crank axle via a one-way clutch bearing. A free end of the flexible rod contacts a portion 12 of the crank arm.

More recently, strain gauges have been used to detect a pedaling force during pedaling. For example, a force sensor is disclosed in U.S. Patent Application Publication No. 2010/0282001 (assigned to Shimano Inc.), which utilizes a strain gauge for detecting a pedaling force applied to a crank axle during pedaling. Another example is disclosed in U.S. Pat. No. 8,006,574 where a strain gauge is used on a crank arm to detect a pedaling force by a rider. Typically, the strain gauge needs to be installed with a high accuracy to obtain accurate measurements. Thus, the manufacturing costs and/or manufacturing time in manufacturing a bicycle crank arm increases when a strain gauge is installed thereon to detect a pedaling force by a rider.

SUMMARY

Generally, the present disclosure is directed to a bicycle crank arm that is provided with a sensing arrangement that detects a pedaling force or power being applied on bicycle the crank arm.

In one embodiment, a bicycle crank arm is provided that basically comprises a crank body, a sensor support member and a power sensing device. The crank body includes a crank axle mounting portion and a pedal mounting portion. The sensor support member is disposed in a cavity of the crank body and attached to the crank body. The power sensing device is supported on the sensor support member.

With this bicycle crank arm, a power sensing device can be mounted to a bicycle crank arm in a relatively simple manner. Additional inventive features, objects, aspects and advantages of the disclosed bicycle crank arm will become apparent to those skilled in the bicycle field from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
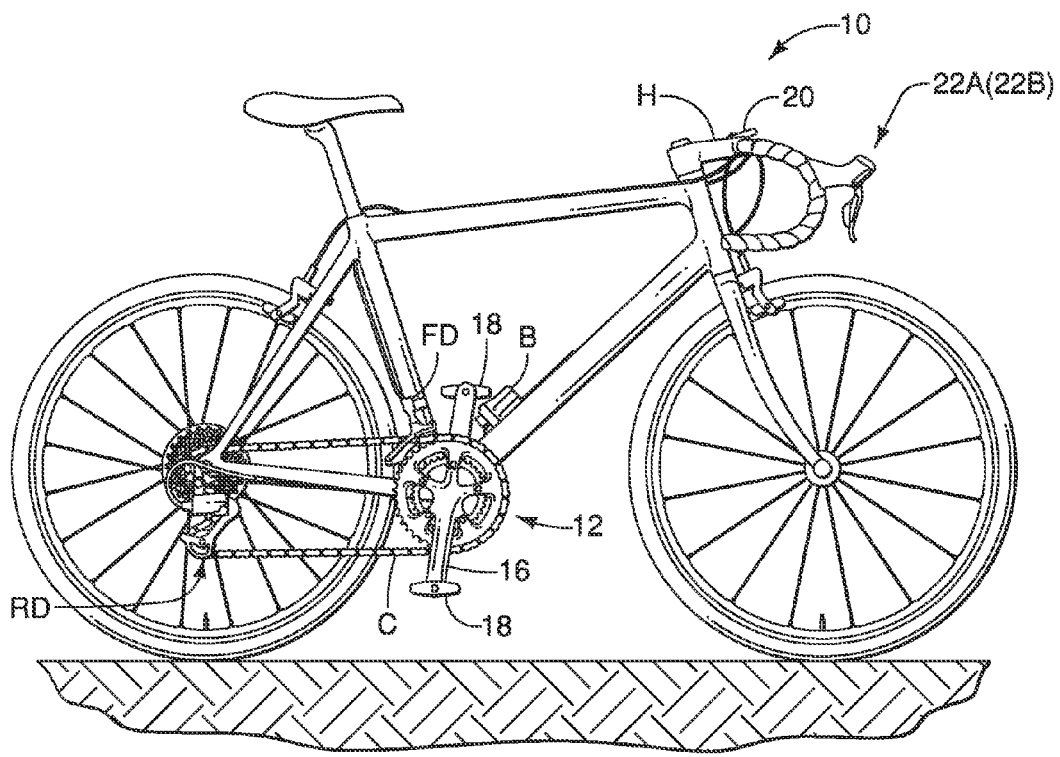
FIG. 1 is a side elevational view of a bicycle that is equipped with electrically-controlled bicycle components and a bicycle crank assembly having a pair of bicycle crank arms in accordance with a first embodiment.

Referring to initially to FIG. 1, a bicycle 10 is illustrated that includes a bicycle crank axle assembly 12 having a first (left) bicycle crank arm 14 in accordance with a first embodiment. Here, the bicycle 10 is a road style bicycle that includes various electrically-controlled components. Of course, it will be apparent to those skilled in the art from this disclosure that the axle assembly 12 can be used with other types of bicycles. The bicycle crank axle assembly 12 further includes a second (right) crank arm 16. The free ends of the bicycle crank arms 14 and 16 are each provided with a bicycle pedal 118. A cyclist applies a pedaling force on the bicycle pedals 18 and then this force is transmitted to the bicycle crank arms 14 and 16 for moving a bicycle chain C to propel the bicycle 10 in a conventional manner. As explained hereinafter, the bicycle crank axle assembly 12 is provided with a bicycle input force processing apparatus that detects a pedaling force to provide information (e.g., power transmitted to the bicycle crank axle assembly 12), which can be conveyed to the rider and/or used by various electronic components. The bicycle 10 is provided with a battery B for supplying electrical power to various electronic components of the bicycle 10.

Figure 2:
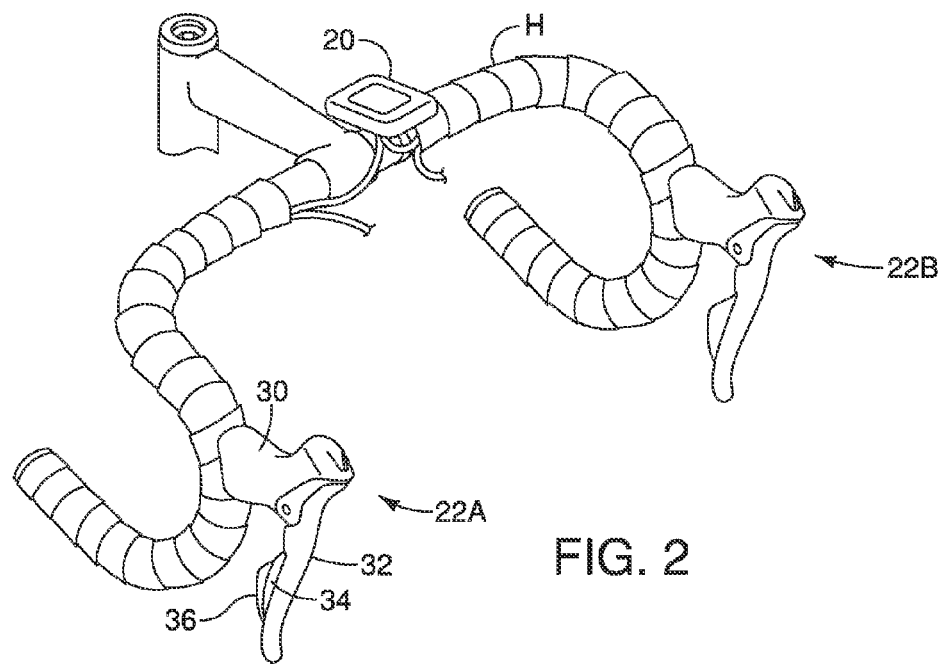
FIG. 2 is a perspective view of the bicycle handlebar and the handlebar mounted components illustrated FIG. 1.

As illustrated in FIG. 2, the bicycle 10 has a handlebar H with a cycle computer 20 and a pair of electronic shifters 22A and 22B. Preferably, the battery B supplies electrical power to electronic shifters 22A and 22B. The cycle computer 20 can have its own power source (preferably built in), or can receive electrical power from the battery B. The electronic shifters 22A and 22B constitute shift command units that are electrical connected to the cycle computer 20 for providing shifting information to the cycle computer 20 in response to operation of the electronic shifters 22A and 229. The electronic shifter 22A is electrically connected to an electronic rear derailleur RD (FIG. 1), while the electronic shifter 22B is electrically connected to an electronic front derailleur FD (FIG. 1). Of course, the electronic shifter 22A can be electrically connected to the electronic front derailleur FD and the electronic shifter 229 can be electrically connected to the electronic rear derailleur RD, if needed and/or desired. In the illustrated embodiment of FIG. 1, the electronic shifters 22A and 22B are road style shifters that include a braking function. However, it will be apparent to those skilled in the art from this disclosure that other types of electronic shifters can be used. Electronic shifters are known in the bicycle field, and thus, the electronic shifters 22A and 229 will not be discussed and/or illustrated in detail herein. As explained hereinafter, the bicycle crank axle assembly 12 is operatively connected to the cycle computer 20 for providing information (e.g., power transmitted to the bicycle crank axle assembly 12) to the cycle computer 20. The bicycle crank axle assembly 12 can be wired to the cycle computer 20, or can wirelessly communicate with the cycle computer 20 as needed and/or desired.

Figure 3:
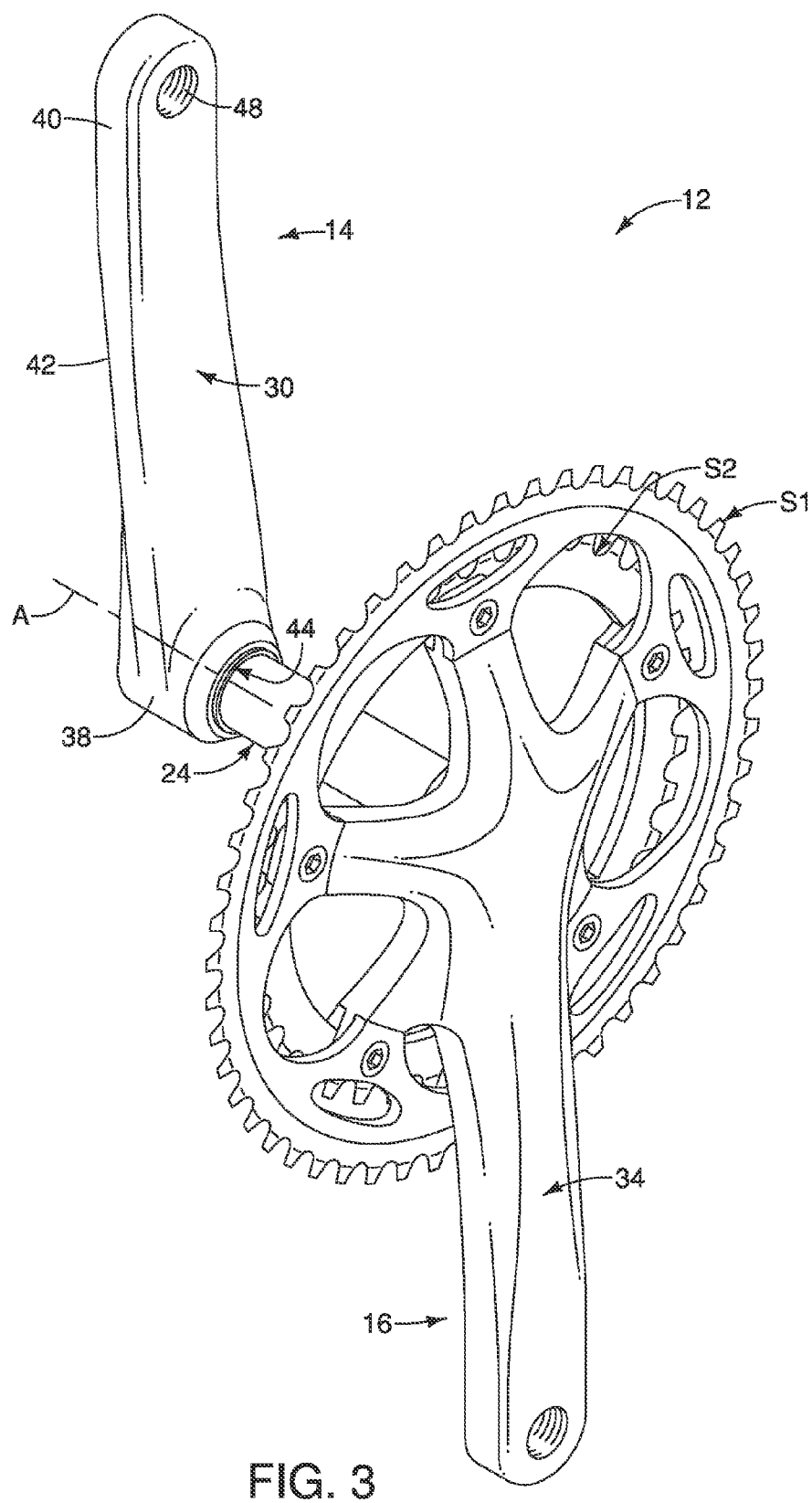
FIG. 3 is a perspective view of the bicycle crank assembly illustrated FIG. 1.

As illustrated in FIG. 3, the bicycle crank axle assembly 12 further includes a crank axle 24. The first and second crank arms 14 and 16 are fixedly coupled to the crank axle 24 such that the first and second crank arms 14 and 16 extend perpendicularly from the crank axle 24 in opposite directions. In the illustrated embodiment, the first crank arm 14 is attached to a first end of the crank axle 24 in a releasable and reinstallable manner. The second crank arm 16 is attached to a second end of the crank axle 24 in a conventional manner (e.g., crimping, locking ring, adhesive, etc.). In the first illustrated embodiment, the second crank arm 16 has a pair of sprockets S1 and S2. The sprockets S1 and S2 are fixedly mounted to the second crank arm 16 in a conventional manner (e.g., ring nuts and ring bolts). As seen in FIG. 2, the longitudinal center of the crank axle 24 defines a rotational axis A of the bicycle crank axle assembly 12.

Figure 4:
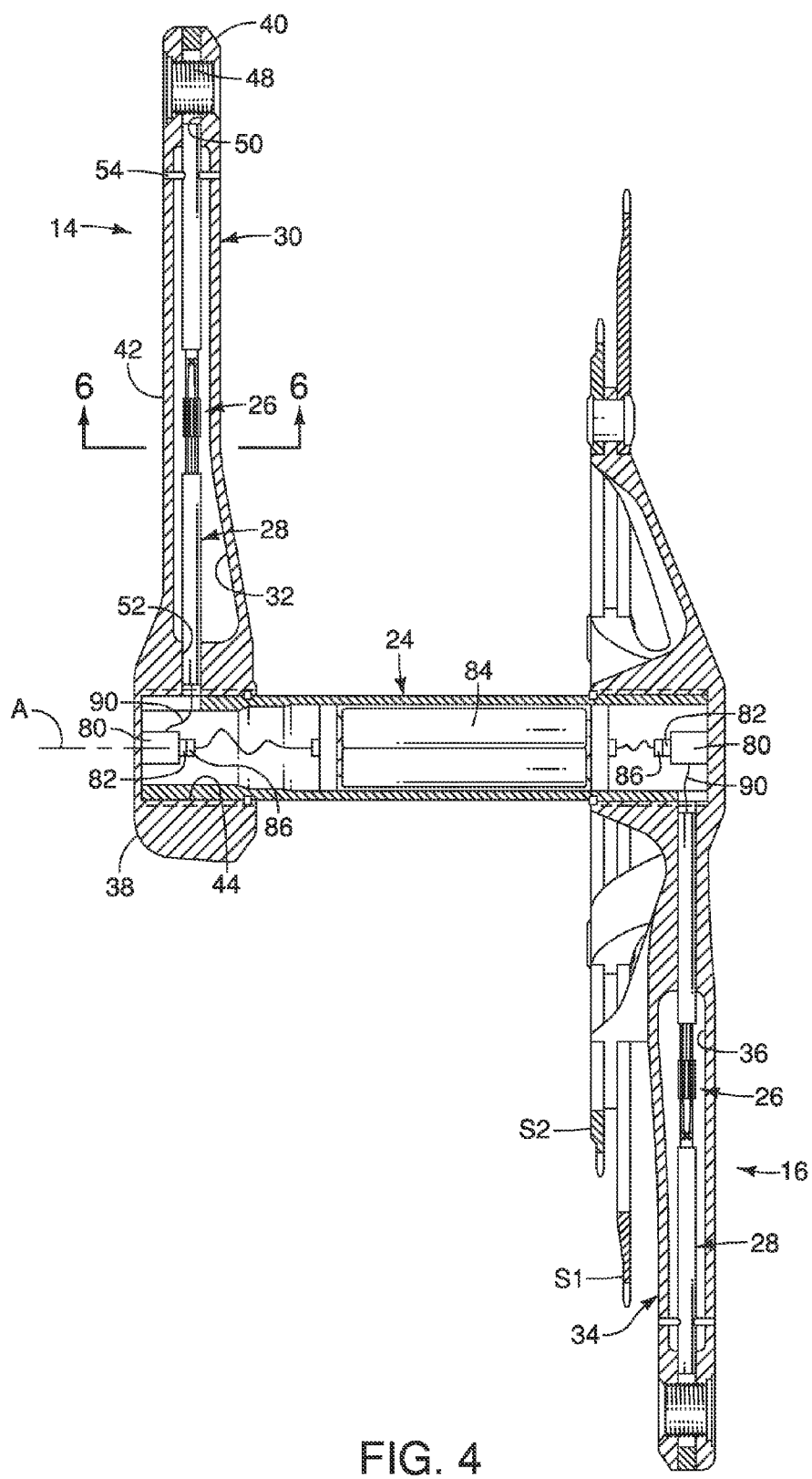
FIG. 4 is a cross sectional view of the bicycle crank assembly illustrated in FIGS. 1 and 3.
Figure 5:
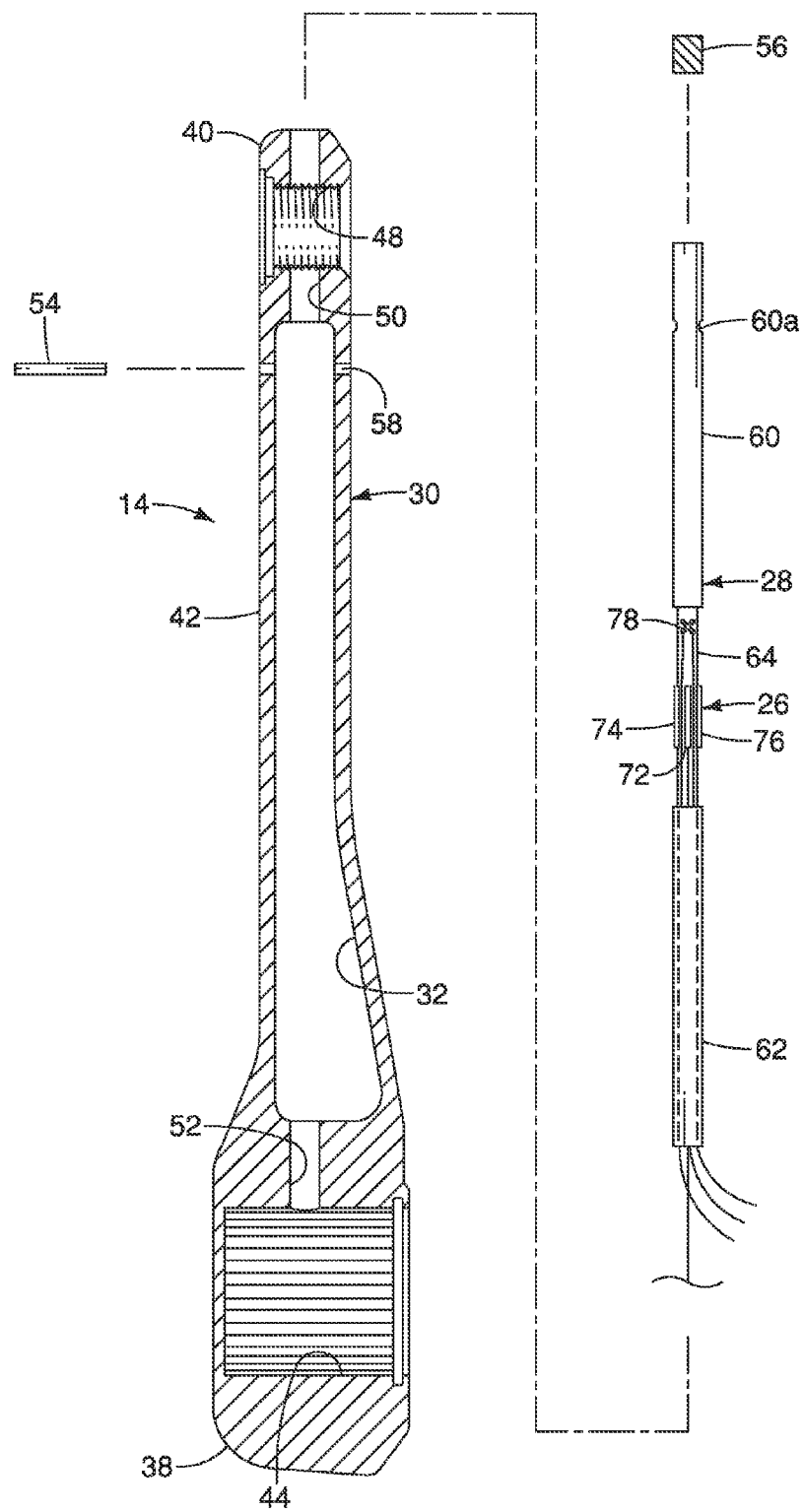
FIG. 5 is a longitudinal cross sectional view of the left bicycle crank arm illustrated in FIGS. 1, 3 and 4, with the power sensing device exploded out of the left bicycle crank arm.

Referring now to FIGS. 4 and 5, the first and second crank arms 14 and 16 will now be discussed in more detail. Basically, the first and second crank arms 14 and 16 are each provided with a power sensing device 26 that is supported on a sensor support member 28. As explained hereinafter, the sensor support member 28 mounts the power sensing device 26 to the crank arm 14 or 16 in order to measure torque or power being applied to the crank arm 14 or 16. The information from the power sensing device 26 then may be used to calculate the effort exerted by the rider and/or used to aiding operating a component of the bicycle 10.

More specifically, the first crank arm 14 includes a crank body 30 that has a cavity 32 that receives one of the power sensing devices 26, while the second crank arm 16 includes a crank body 34 that has a cavity 36 that receives the other one of the power sensing device 26. White the crank bodies 30 and 34 have different overall configurations, the cavities 32 and 36 of the crank bodies 30 and 34 are essentially identical in configuration such that the power sensing devices 26 are supported within the cavities 32 and 36 by the sensor support members 28. Thus, only the first crank arm 14 will be discussed in further detail herein. However, the following description of the mounting of the power sensing device 26 within the cavity 32 by the sensor support member 28 also applies to the second crank arm 16.

As seen in FIGS. 4 and 5, the sensor support member 28 is disposed in the cavity 32 of the crank body 30, and non-movably attached to the crank body 30. The sensor support member 28 is a stick shaped member that is used to easily and accurately position the power sensing device 26 on the crank body 30 such that strain occurring in the crank body 30 from a pedaling force is transmitted to the power sensing device 26 via the sensor support member 28. Preferably, the sensor support member 28 is non-detachably fixed to the crank body 30 to the crank body 30 at two longitudinally spaced apart locations of the crank body 30 for ensuring the pedaling force is transmitted to the power sensing device 26 via the sensor support member 28.

As seen in FIGS. 3 to 5, the crank body 30 further includes a crank axle mounting portion 38, a pedal mounting portion 40 and an arm portion 42. The cavity 32 is formed in the arm portion 42 that is located between the crank axle mounting portion 38 and the pedal mounting portion 40. The arm portion 42 constitutes a base member of the crank body 30. In the first illustrated embodiment, the crank axle mounting portion 38, the pedal mounting portion 40 and the arm portion 42 are integrally formed as a one-piece, unitary member of a metallic material that is typically used in manufacturing crank arms. However, the crank body 30 can be formed of a non-metallic material such as a fiber reinforced material (e.g., a carbon fiber material). While the crank body 30 is generally a very rigid member, the crank body 30 undergoes a slight amount of resilient flexing while a rider is pedaling. In other words, the arm portion 42 of the crank body 30 is elastically deformed upon application of a pedaling force being applied to the pedal mounting portion 40 via the bicycle pedals 18 while a rider is pedaling. Thus, the crank body 30 is elastically deformable upon application of a pedaling force.

As seen in FIG. 4, the crank axle mounting portion 38 has a splined bore 44. Here, the first crank arm 14 is attached to the crank axle 24 using a locking ring. However, the first crank arm 14 can be attached to the crank axle 24 in any conventional manner. For example, the first crank arm 14 can be modified to have a radial slit that extends from the splined bore 44 and use two clamping bolts can be threaded into the end portion of the crank arm 14 to secure the first crank arm 14 to the crank axle 24 in a conventional manner. The pedal mounting portion 40 has a threaded bore 48 for fixedly attaching one of the bicycle pedals 18. In the case of a left crank arm, the thread of the threaded bore 48 is a left-hand thread for attaching the left bicycle pedal. On the other hand, in the case of a right crank arm, a right-hand thread is typically used for attaching the right bicycle pedal.

Referring to FIGS. 4 and 5, the power sensing device 26 and the sensor support member 28 will now be discussed in more detail. While a rider is pedaling the crank assembly 12, the crank body 30 will undergo a slight amount of resilient flexing due to the application of a pedaling force in the direction of rotation. In other words, when the rider rotates the crank assembly 12, the crank arm 14 will slightly bend based on the pedaling force from the rider. In this way, the arm portion 42 of the crank body 30 will elastically deformed such that the pedal mounting portion 40 will deflect relative to the crank axle mounting portion 38.

The sensor support member 28 is configured to deform upon application of a pedaling force being applied to the pedal mounting portion 40. In particular, the sensor support member 28 is mounted to the crank body 30 such that the sensor support member 28 will elastically deformed with the arm portion 42 of the crank body 30 upon application of a pedaling force being applied to the pedal mounting portion 40. In the first illustrated embodiment, the sensor support member 28 accurately and easily supports the power sensing devices 26 within the cavity 32. In particular, an end surface of one of the crank axle mounting portion 38 and the pedal mounting portion 40 includes an access bore 50 that communicates with the cavity 32 of the crank body 30 for inserting the sensor support member 28 into the cavity 32 of the crank body 30. In the first illustrated embodiment, the access bore 50 is formed in the pedal mounting portion 40. However, the access bore 50 can be formed in an end surface of the crank axle mounting portion 38. In either case, the access bore 50 is dimensioned with respect to the sensor support member 28 such that the sensor support member 28 is installed into the cavity 32 via the access bore 50.

As seen in FIG. 5, the crank body 30 also includes an access bore 52 that is formed in the crank axle mounting portion 38 and connects the cavity 32 to the splined bore 44. The access bore 52 constitutes a wiring passageway for wiring of the power sensing devices 26 to exits from the cavity 32 of the crank body 30 and extend into the hollow interior of the crank axle 24. Preferably, a fixing pin 54 is used to fix the sensor support member 28 to the crank body 30 as explained later in more detail. Also a plug 56 is provided to close off the opening of the access bore 50. The crank body 30 further has a transverse mounting bore 58. The fixing pin 54 can be press-fitted into a transverse mounting bore 58. Alternatively, the fixing pin 54 can be a bolt and the transverse mounting bore 58 can be partially threaded for receiving the bolt to fix the sensor support member 28 in the access bore 50.

As illustrated in FIGS. 4 and 5, in the first illustrated embodiment, the sensor support member 28 includes a first portion 60, a second portion 62 and an intermediate portion 64. The power sensing device 26 is supported on the intermediate portion 64 of the sensor support member 28 that is disposed between the first and second portions 60 and 62 of the sensor support member 28. The first portion 60 is in contact with the crank body 30 at a first location, which corresponds to a section of the access bore 50 at the cavity 32. Preferably, the first portion 60 is fixed within the access bore 50 by using an adhesive bond therebetween and/or either a thread connection or a press connection therebetween. The second portion 62 is in contact with the crank body 30 at a second location that longitudinally spaced apart from the first location (at the access bore 50) with respect to a longitudinal axis of the crank body 30 by the intermediate portion 64. In particular, the second location corresponds to the access bore 52 that is formed in the crank axle mounting portion 38 and connects the cavity 32 to the splined bore 44. Preferably, the second portion 62 is fixed within the access bore 52 by using an adhesive bond therebetween and/or either a thread connection or a press connection therebetween. With this arrangement, the power sensing device 26 is supported in the cavity 32 in a middle area of the crank arm 14 and the first and second portions 60 and 62 are located at opposite longitudinal ends of the cavity 32. The sensor support member 28 is fixed in at least one of the access bores 50 and 52 so that the sensor support member 28 does not move relative to the crank body 30.

In the first illustrated embodiment, the first portion 60 is further fixed within a section of the access bore 50 by the fixing pin 54. Preferably, as mentioned above, the first portion 60 tightly contacts the internal surface of the access bore 50, and is fixed within the access bore 50 by using an adhesive bond therebetween and/or either a thread connection or a press connection therebetween to ensure good transfer of the pedaling force from the crank body 30 is properly transmitted to the power sensing device 26 via the sensor support member 28. In the illustrated embodiment, the first portion 60 and the access bore 50 have circular cross sections that mate together. Thus, the fixing pin 54 ensures proper orientation of the power sensing device 26 in a middle area of the crank arm 14 using the sensor support member 28. The fixing pin 54 passes through the transverse fixing bore 60a of the first portion 60 as illustrated in FIG. 4 to fix the orientation of the power sensing device 26 with respect to the crank body 30. The fixing pin 54 can be press-fitted or screwed into a transverse mounting bore 58 of the crank body 30. Also the transverse mounting bore 58 can be a through bore or a blind bore as needed and/or desired.

The second portion 62 tightly contacts the internal surface of the access bore 52 to ensure good transfer of the pedaling force from the crank body 30 to the second portion 62. The second portion 62 preferably includes a tubular section that defines an internal passageway for receiving electrical wire(s) and/or a flexible print circuit (flexible print board). Preferably, as mentioned above, the second portion 62 tightly contacts the internal surface of the access bore 52, and is fixed within the access bore 52 by using an adhesive bond therebetween and/or either a thread connection or a press connection therebetween to ensure good transfer of the pedaling force from the crank body 30 is property transmitted to the power sensing device 26 via the sensor support member 28. The fixing pin 54 can be eliminated by configuring the access bores 50 and 52 and the first and second portions 60 and 62 so that they do not rotate relative to each other. For example, at least one of the first and second portions 60 and 62 is preferably keyed or has a non-circular in transverse cross section to ensure correct orientation of the sensor support member 28 with respect to the crank body 30.

In other to aid in the assembly of the sensor support member 28 into the crank body 30, the second portion 62 has a maximum width that is equal to or less than a maximum width of the first portion 60 of the sensor support member 28. Likewise, the access bore 52 has a maximum width that is equal to or less than a maximum width of the access bore 52 such that the first and second portions 60 and 62 are snugly received in the access bores 50 and 52. In this way, the second portion 62 can easily pass through the access bore 50 during insertion of the sensor support member 28 into the crank body 30 via the access bore 50.

Figure 6:
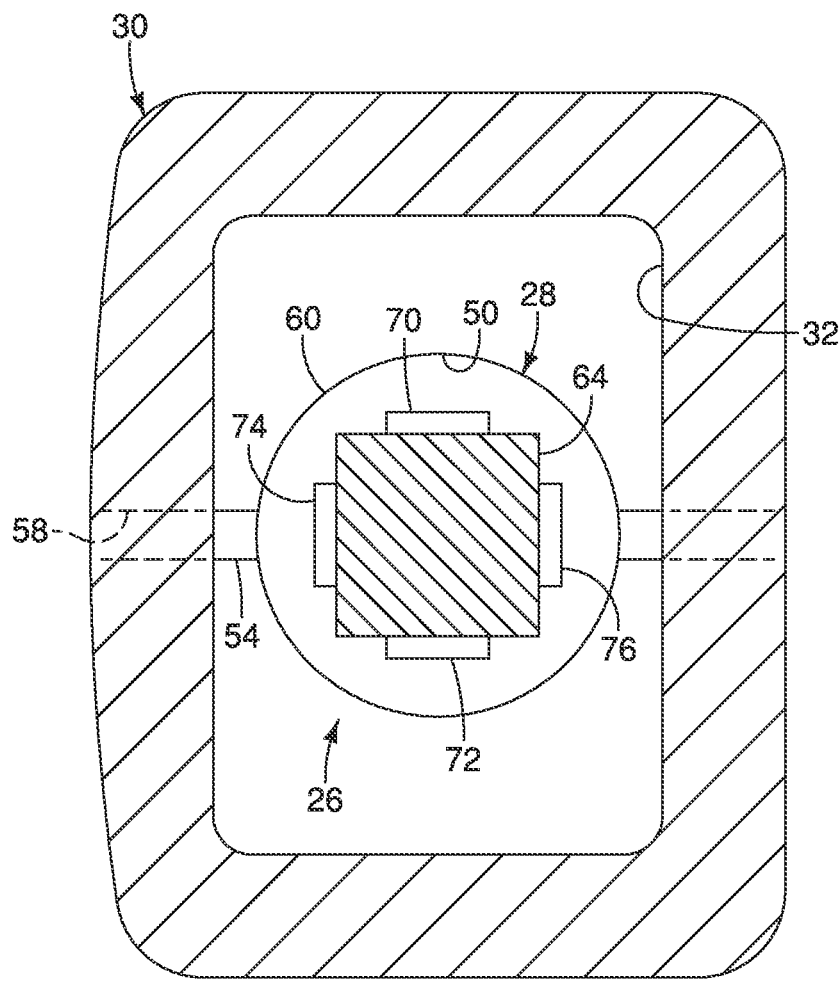
FIG. 6 is a simplified transverse cross sectional view of the left bicycle crank arm as seen along section line 6-6 of FIG. 4.

The power sensing device 26 includes four sensor elements 70, 72, 74 and 76 that are disposed at different angular locations with respect to a longitudinal axis of the crank body 30. Preferably, as seen in FIG. 6, the intermediate portion 64 of the sensor support member 28 has a transverse cross section that is rectangular with respect to the longitudinal axis of the crank body 30. Thus, the intermediate portion 64 of the sensor support member 28 defines four side surfaces with one of the sensor elements 70, 72, 74 and 76 being fixed to each of the four side surfaces. The sensor elements 70 and 72 are arranged on opposite side surfaces of the intermediate portion 64 that are parallel to the rotational axis A of the first crank arm 14. The sensor elements 74 and 76 are arranged on opposite side surfaces of the intermediate portion 64 that are perpendicular to the rotational axis A of the first crank arm 14. The detection directions of the four sensor elements 70, 72, 74 and 76 extend in the longitudinal direction of the first crank arm 14.

While the power sensing device 26 includes four sensor elements 70, 72, 74 and 76, the power sensing device 26 can be constructed with only two of the sensor elements 70, 72, 74 and 76 such that the sensor elements are arranged on two of the side surfaces of the intermediate portion 64 of the sensor support member 28 that are perpendicular to each other. However, preferably, the sensor elements 70, 72, 74 and 76 are arranged on each of the side surfaces of the intermediate portion 64 of the sensor support member 28. The sensor elements 70, 72, 74 and 76 are formed of at least one of a strain gauge and semiconductor sensor for detection of strain in the crank arm 14.

Preferably, as seen in FIG. 5, the power sensing device 26 further includes a sensor element 78 that is disposed on the intermediate portion 64. In the illustrated embodiment, the sensor element 78 has two sensing parts that are arranged to form an "X" or "+" shape with a pair of detection directions. Preferably, the sensor element 78 is arranged on the intermediate portion 64 such that detection directions of the sensor element 78 intersect the longitudinal direction of the first crank arm 14 at a prescribed angle, preferably about forty-five degrees as illustrated. Also preferably, the two detection directions of the sensor element 78 are perpendicular to each other as illustrated. The sensor element 78 is formed of either a strain gauge or semiconductor sensor for detection of strain in the crank arm 14.

As seen in FIG. 4, in the first embodiment, each of the first and second crank arms 14 and 16 further includes a communication unit 80. It will be apparent from this disclosure that the communication units 80 can be combined into a single communication unit that is mounted on either one of the crank arms 14 and 16 or the crank axle 24 as needed and/or desired. The communication units 80 each have an electrical connector 82. The crank assembly 12 further includes a battery unit 84 that mounted within the interior of the crank axle 24. The battery unit 84 has a pair of electrical connectors 86 that mate with the electrical connectors 84 of the communication units 80.

The communication units 80 are electrically connected to the power sensing devices 26 in a conventional manner using electrical conductors 90, which can be for example electrical wires or flexible electrical conductor boards. The battery unit 84 supplies electrical power to the communication units 80. The power sensing devices 26 of the first and second crank arms 14 and 16 are operatively connected to the communication units 80 via the electrical conductors 90 to receive signals from the power sensing devices 26. Based on signals from the power sensing devices 26, the communication units 80 output information to various bicycle components as needed and/or desired. While the communication units 80 are mounted to the crank arms 14 and 16, they can be located elsewhere. Also while the battery unit 84 is disposed in the hollow interior of the crank axle 24, in the illustrated embodiment, the battery unit 84 can be located elsewhere.

Preferably, each of the communication units 80 includes a microprocessor and a transmitter so that the communication units 80 wirelessly transmit information to one or more electrical bicycle components such as the cycle computer 20, the electronic front derailleur ED and the electronic rear derailleur RD as seen in FIG. 1. Alternatively, the communication units 80 can be operatively connected to one or more of the cycle computer 20, the electronic front derailleur FD and the electronic rear derailleur RD by one or more electrical cords.

Figure 7:
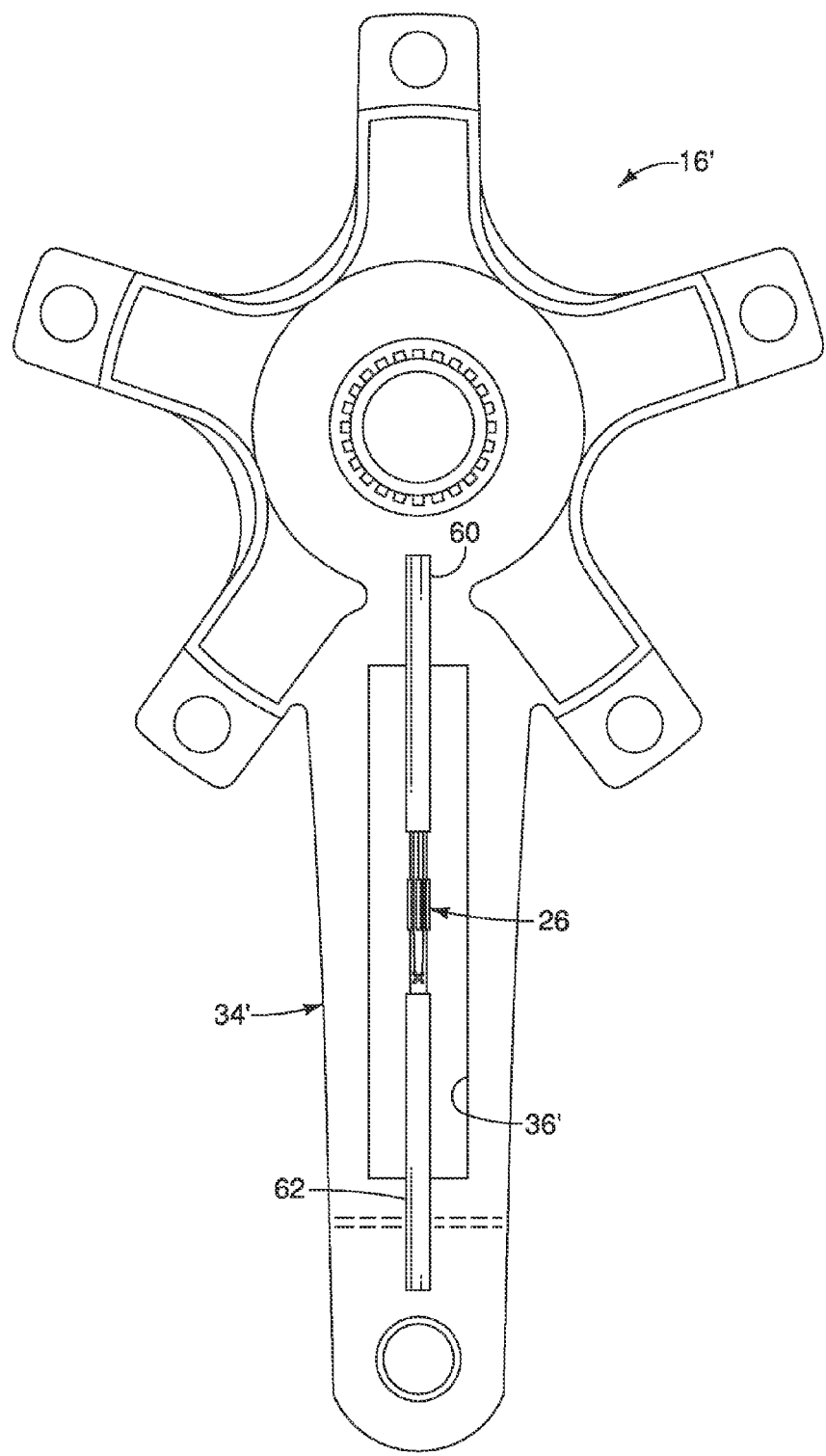
FIG. 7 is an inside elevational view of an alternate right bicycle crank arm illustrated in accordance with a second embodiment.

Referring now to FIG. 7, an alternate second (right) crank arm 16' is illustrated with a second embodiment. Basically, the second crank arm 16' replaces the second crank arm 16 of the crank assembly 12 that is illustrated in FIGS. 1, 3 and 4. Here, the second crank arm 16' has an open cavity 36' in the form of a recess that is open on the side that faces the bicycle 10 when installed. The cavity 36' is configured to tightly retain the power sensing device 26 of the first embodiment. Preferably, the power sensing device 26 is non-detachably disposed in the cavity 36' by a press-fit and/or bonded with an adhesive or the like. In view of the similarity between the second crank arms 16' and 16, the parts of the second crank arm 16' that are identical in function to the parts of the second crank arm 16 will be not be discussed for the sake of brevity. Rather the description of the parts of the second crank arm 16 applies to the second crank arm 16' unless explicitly stated and/or illustrated as being different.

Optionally, a cover member (not shown) is fixedly coupled to the crank body 34' for closing off the opening of the cavity 36' and to conceal the power sensing device 26. The cover member can be an integral part of the power sensing device 26 or a separate member. For example, the cavity 32 could be formed so as to open on the side of the crank body 34 that faces the bicycle frame so that the power sensing device 26 is hidden from view when installed on the bicycle 10.

Figure 8:
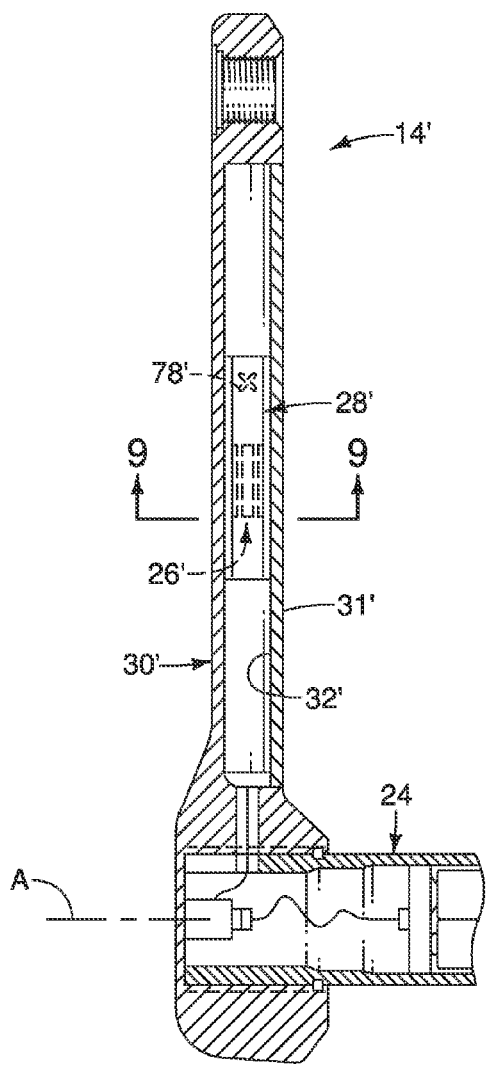
FIG. 8 is a longitudinal cross sectional view of an alternate left bicycle crank arm in accordance with a third embodiment.
Figure 9:
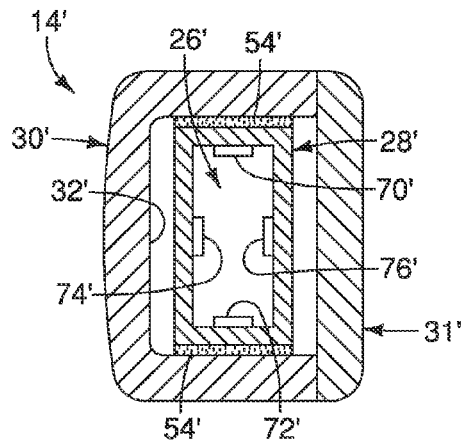
FIG. 9 is a simplified transverse cross sectional view of the left bicycle crank arm as seen along section line 9-9 of FIG. 8.

Referring now to FIGS. 8 and 9, an alternate first (left) crank arm 14' is illustrated with a third embodiment. Basically, the first crank arm 14' replaces the first crank arm 14 of the crank assembly 12 that is illustrated in FIGS. 1, 3 and 4. The first crank arm 14' can be used with either the second crank arm 16 or 16'. In this third embodiment, the first crank arm 14' has a modified power sensing device 26' that is identical in construction to the power sensing device 26, discussed above, except that a modified sensor support member 28' is used for mounting the power sensing device 26' to a crank body 30' of the first crank arm 14'. The power sensing device 26' is disposed within a cavity 32' of the crank body 30'.

Also in this embodiment, the first crank arm 14' has a cover member 31' that is fixedly coupled to the crank body 30' for closing off the opening of the cavity 32' and to conceal the power sensing device 26'. The crank body 30' constitutes a base member and the cover member 31' is attached to the crank body 30' (i.e., the base member) to substantially enclose the cavity 32'. However, it will be apparent from this disclosure that the cover member 31' is not necessary. In view of the similarity between the first crank arms 14' and 14, the parts of the first crank arm 14' that are identical in function to the parts of the first crank arm 14 will be not be discussed for the sake of brevity. Rather the description of the parts of the first crank arm 14 applies to the first crank arm 14' unless explicitly stated and/or illustrated as being different.

As seen in FIG. 9, the sensor support member 28' is fixed to internal sides of the cavity 32' that are formed by the crank body 30' (i.e., the base member). In this embodiment of FIGS. 8 and 9, an adhesive 54' is used to bond the sensor support member 28' to internal sides of the cavity 32'. Of course, the sensor support member 28' can be fixed to the crank body 30' in other ways as needed and/or desired.

The power sensing device 26' includes four sensor elements 70', 72', 74' and 76' that are disposed at different angular locations with respect to a longitudinal axis of the crank body 30'. Preferably, as seen in FIG. 9, the intermediate portion of the sensor support member 28' has a tubular transverse cross section that is rectangular with respect to the longitudinal axis of the crank body 30'. One of the sensor elements 70', 72', 74' and 76' is fixed to each internal side surface. The sensor elements 70' and 72' are arranged on opposite internal side surfaces of the intermediate portion that are parallel to the rotational axis A of the first crank arm 14'. The sensor elements 74' and 76' are arranged on opposite internal side surfaces of the intermediate portion that are perpendicular to the rotational axis A of the first crank arm 14'. The detection directions of the four sensor elements 70', 72', 74' and 76' extend in the longitudinal direction of the first crank arm 14. The arrangement of the sensor elements 70', 72', 74' and 76' is the same as the first embodiment, as discussed above, except that intermediate portion of the sensor support member 28' is hollow and the sensor elements 70', 72', 74' and 76' are attached to the internal side surfaces of the intermediate portion of the sensor support member 28'.

Preferably, the power sensing device 26' further includes a sensor element 78' that is disposed on the intermediate portion of the sensor support member 28'. Preferably, the sensor element 78' is arranged such that detection directions of the sensor element 78' intersect the longitudinal direction of the first crank arm 14' at a prescribed angle, preferably about forty-five degrees as illustrated. Also preferably, the two detection directions of the sensor element 78' are perpendicular to each other as illustrated. The sensor element 78' is formed of either a strain gauge or semiconductor sensor for detection of strain in the first crank arm 14'.

Figure 10:
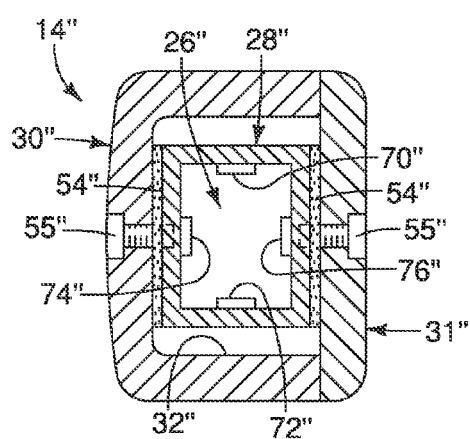
FIG. 10 is a simplified transverse cross sectional view, similar to FIG. 9, of alternate configuration of the left bicycle crank arm of FIG. 8.

As seen in FIG. 10, a first (left) crank arm 14" is illustrated that is identical to the first (left) crank arm 14', as discussed above, except for the manner of fixing a power sensing device 26" to a crank body 30" and a cover member 31" of the first crank arm 14". Here, the power sensing device 26" is attached by adhesive 54" and a pair of bolts 55" to the crank body 30' and the cover member 31'. The power sensing device 26" is identical to the power sensing device 26' except that the cross sectional shape has been changed and a pair of threaded mounting holes have been added for receiving the bolts 55". In view of the similarity between the power sensing devices 26' and 26", the parts of the power sensing device 26" that are identical to the parts of the power sensing device 26' will be given the same reference numerals as the parts of the power sensing device 26' but with a double prime instead of a single prime. Moreover, the descriptions of the parts of the power sensing device 26" that are identical to the parts of the power sensing device 26' will be omitted for the sake of brevity.

Figure 11:
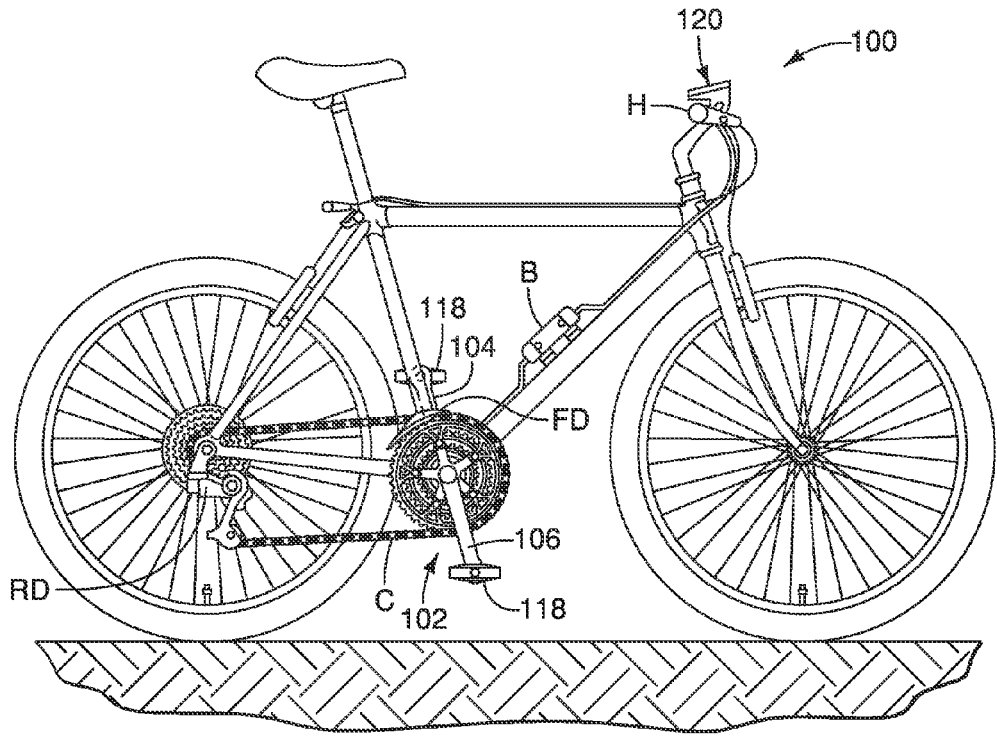
FIG. 11 is a side elevational view of a bicycle is equipped with electrically-controlled bicycle components and a bicycle crank assembly in accordance with a fourth embodiment.

Referring now to FIG. 11, a bicycle 100 is illustrated that includes a bicycle crank axle assembly 102 having a first (left) bicycle crank arm 104 and a second (right) crank arm 106. For the sake of simplicity, some of the common components of the bicycle 100 will be given the same reference numeral of the same type of component of the bicycle 10. Here, the bicycle 100 is a sport bicycle such as a mountain bicycle that includes various electrically-controlled components. The free ends of the bicycle crank arms 104 and 106 are each provided with a bicycle pedal 118. A cyclist applies a pedaling force on the bicycle pedals 118 and then this force is transmitted to the bicycle crank arms 104 and 106 for moving the bicycle chain C to propel the bicycle 100 in a conventional manner. As explained hereinafter, the bicycle crank axle assembly 102 is provided with a bicycle input force processing apparatus that detects a pedaling force to provide information (e.g., power transmitted to the bicycle crank axle assembly 102), which can be conveyed to the rider and/or used by various electronic components. The bicycle 100 is provided with a battery B for supplying electrical power to various electronic components of the bicycle 100.

Figure 12:
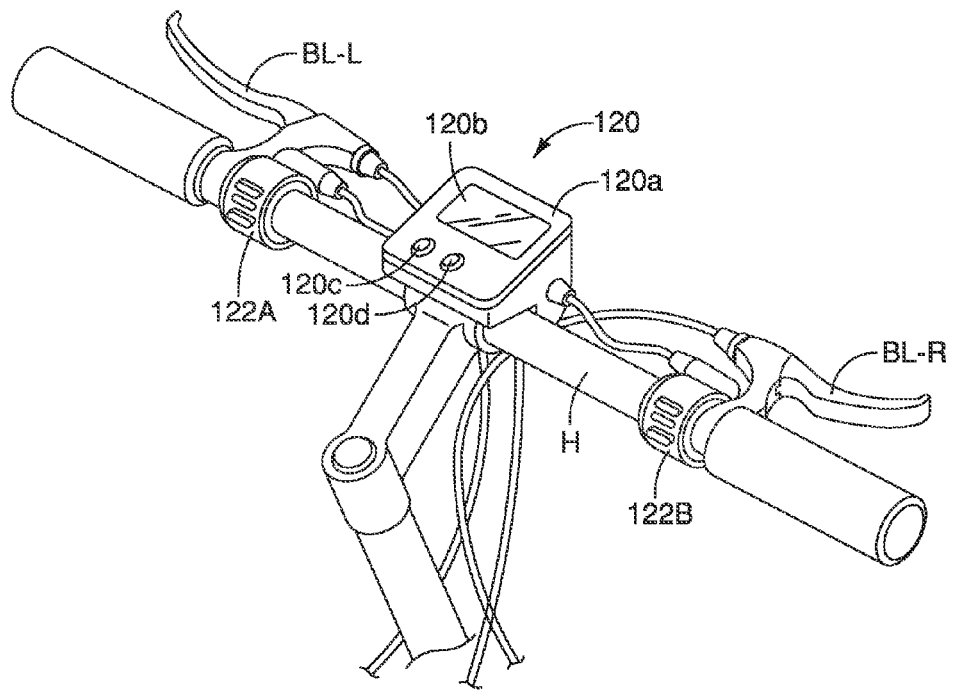
FIG. 12 is a perspective view of the bicycle handlebar and the handlebar mounted components illustrated in FIG. 11.

As illustrated in FIG. 12, the bicycle 100 has a handlebar H with a control unit or cycle computer 120, a pair of brake levers BL-L and BL-R and a pair of electronic shifters 122A and 122B. Preferably, the battery B supplies electrical power to the electronic shifters 122A and 122B. The cycle computer 120 can have its own power source (preferably built in), or can receive electrical power from the battery B. The electronic shifters 122A and 122B constitute shift command units that are electrical connected to the cycle computer 120 for providing shifting information to the cycle computer 120 in response to operation of the electronic shifters 122A and 122B. The electronic shifter 122A is electrically connected to an electronic rear derailleur RD (FIG. 11), while the electronic shifter 122B is electrically connected to an electronic front derailleur FD (FIG. 11). Of course, the electronic shifter 122A can be electrically connected to the electronic front derailleur FD and the electronic shifter 122B can be electrically connected to the electronic rear derailleur RD, if needed and/or desired. Electronic shifters are known in the bicycle field, and thus, the electronic shifters 122A and 122B will not be discussed and/or illustrated in detail herein.

As explained hereinafter, the bicycle crank axle assembly 102 is operatively connected to the cycle computer 120 for providing information (e.g., power transmitted to the bicycle crank axle assembly 102) to the cycle computer 120. The bicycle crank axle assembly 102 can be wired to the cycle computer 120, or can wirelessly communicate with the cycle computer 120 as needed and/or desired.

A first end portion of the right crank arm 106 includes an axle-mounting opening 106a (FIG. 12) for mounting the right crank arm 106 to the crank axle 124, and a second end portion of the right crank arm 106 includes a pedal-mounting opening 106b for mounting one of the pedals 118. Three sprockets are attached to the right crank arm 106. A first end portion of the left crank arm 104 includes an axle-mounting opening 104a for mounting the left crank arm 104 to the crank axle 124, and a second end portion of the left crank arm 104 includes a pedal-mounting opening 104b for mounting the pedal 118. The front derailleur ED selectively engages the chain C with one of the three front sprockets and can be moved by a motor (not shown) that is controlled by the cycle computer 120. Similarly, the rear derailleur RD selectively engages the chain C with one of the several rear sprockets and can be moved by a motor (not shown) that is controlled by the cycle computer 120.

As shown in FIG. 12, the cycle computer 120 includes a box-like housing 120a. A display unit 120b, a power switch 120c, and a mode switch 120d are arranged on the upper surface of the housing 120a. The electronic shifters 122A and 122B are used for sending commands to operate shifting the rear derailleur RD and the front derailleur FD, respectively. Preferably, the cycle computer 120 is connected to the rear and front derailleurs RD and FD by a connector unit that is provided at the battery B (FIG. 11).

Figure 13:
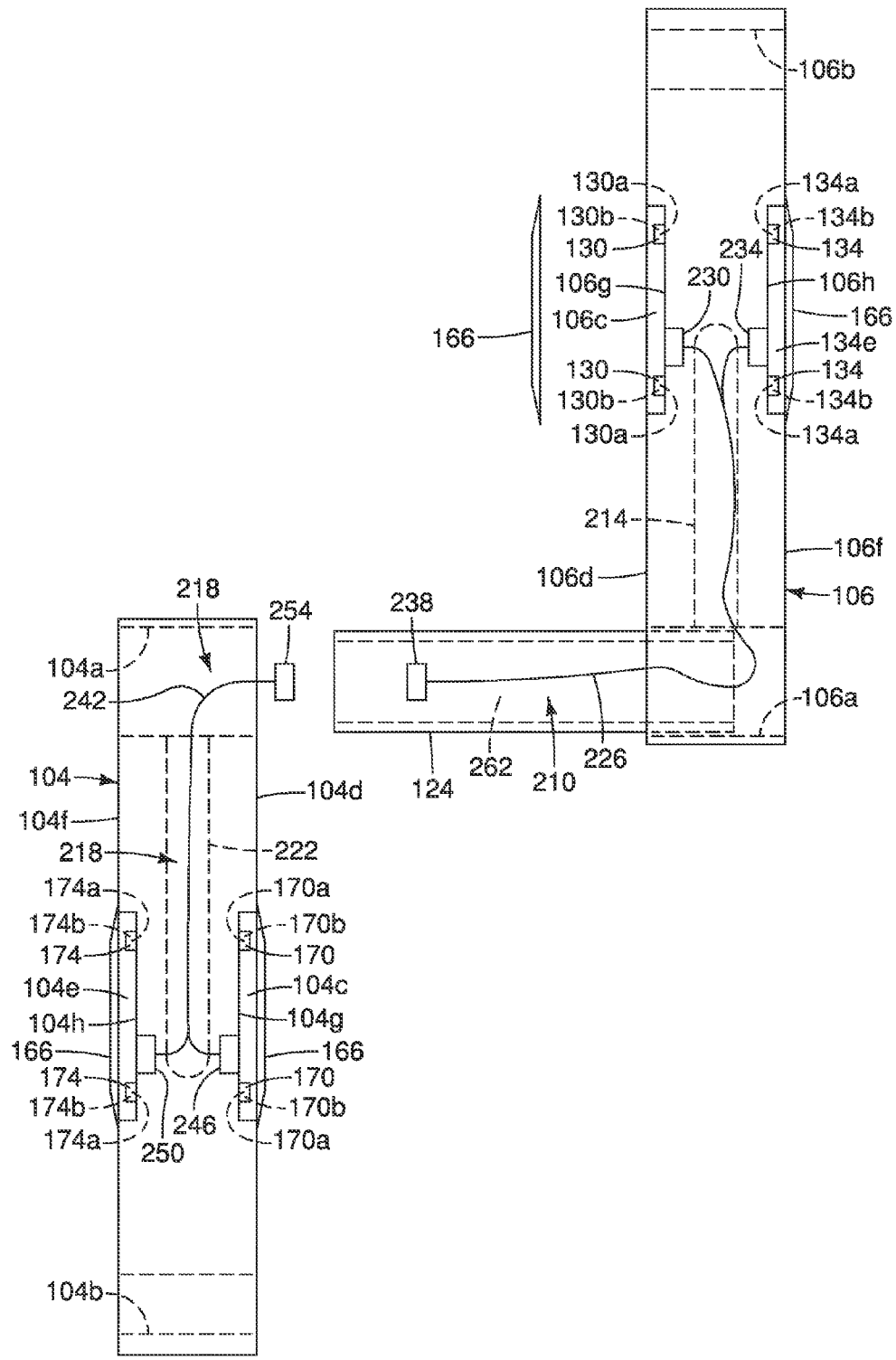
FIG. 13 is a schematic view of the bicycle crank assembly illustrated in FIG. 11 in which the bicycle crank assembly has a pair of bicycle crank arms and a crank axle.

As shown in FIG. 13, in this embodiment, a first circuit-mounting opening 106c is formed at a laterally inner side surface 106d of the crank arm 106, and a second circuit-mounting opening 106e is formed at a laterally outer side surface 106f of the crank arm 106. The first circuit-mounting opening 106c and the second circuit-mounting opening 106e include respective bottom floors 106g and 106h so that the first circuit-mounting opening 106c and the second circuit-mounting opening 106e are formed as recesses in the laterally inner side surface 106d and the laterally outer side surface 106f, respectively.

As used herein, the inner side means the side of the crank arm that faces the bicycle frame when the crank arm is attached to the bicycle, the outer side means the side of the crank arm that faces away from the bicycle frame, the upper side means the side of the crank arm that faces upwardly when the crank arm is oriented generally horizontally with the outer side of the crank arm facing the viewer and the axle-mounting opening on the left, and the lower side means the side of the crank arm that faces downwardly when the crank arm is oriented generally horizontally with the outer side of the crank arm facing the viewer and the axle-mounting opening on the left.

The first circuit-mounting structures 130 are disposed within the first circuit-mounting opening 106c. Second circuit-mounting structures 134 are disposed within the second circuit-mounting opening 106e. The first and second circuit-mounting structures 130 and 134 are configured to detachably mount corresponding measurement boards 138 (FIGS. 14 and 15) to the crank arm 106 at the respective first and second circuit-mounting openings 106c and 106e. The first and second circuit-mounting structures 130 and 134 can be formed as continuous, one-piece structures with the crank arm 106, or they can be separate structures welded to or otherwise bonded or fastened to the crank arm 106. In this embodiment of FIG. 13, the first and second circuit-mounting structures 130 and 134 are structured as cylindrical pillars or some other forms of projections or protuberances. Preferably, but not necessarily, the first and second circuit-mounting structures 130 and 134 can include further circuit-mounting openings 130a and 134a containing further circuit-mounting structures in the form of threads 130b and 134b. In other words, the first circuit-mounting structures 130 and the second circuit-mounting structures 134 can be formed as threaded nuts.

Figure 15:
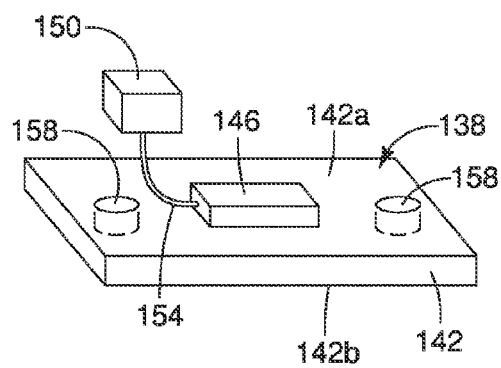
FIG. 15 is a perspective view of a particular embodiment of one of the measurement boards illustrated in FIG. 14.

As shown in FIG. 15, the measurement board 138 can comprise a substrate 142 having atop surface 142a and a bottom surface 142b, a sensor 146 disposed at the top surface 142a for measuring an input force, an electrical connector 150 electrically connected to the sensor 146 through wiring 154, and a pair of mounting openings 158 in the form of through holes. The substrate 142 can be a printed circuit board or a semiconductor, metal or other conductive or nonconductive rigid or flexible sheet. In this embodiment, the sensor 146 comprises a strain gauge (e.g., a plurality of resistors configured as a Wheatstone bridge) that may be affixed to the substrate 142 or formed as part of the substrate 142. The sensor 146 can be formed at least in part from a semiconductor material to detect the strain on the substrate 142. Of course, other configurations of the sensor 146 and the substrate 142 will be readily understood depending upon the material used.

Figure 14:
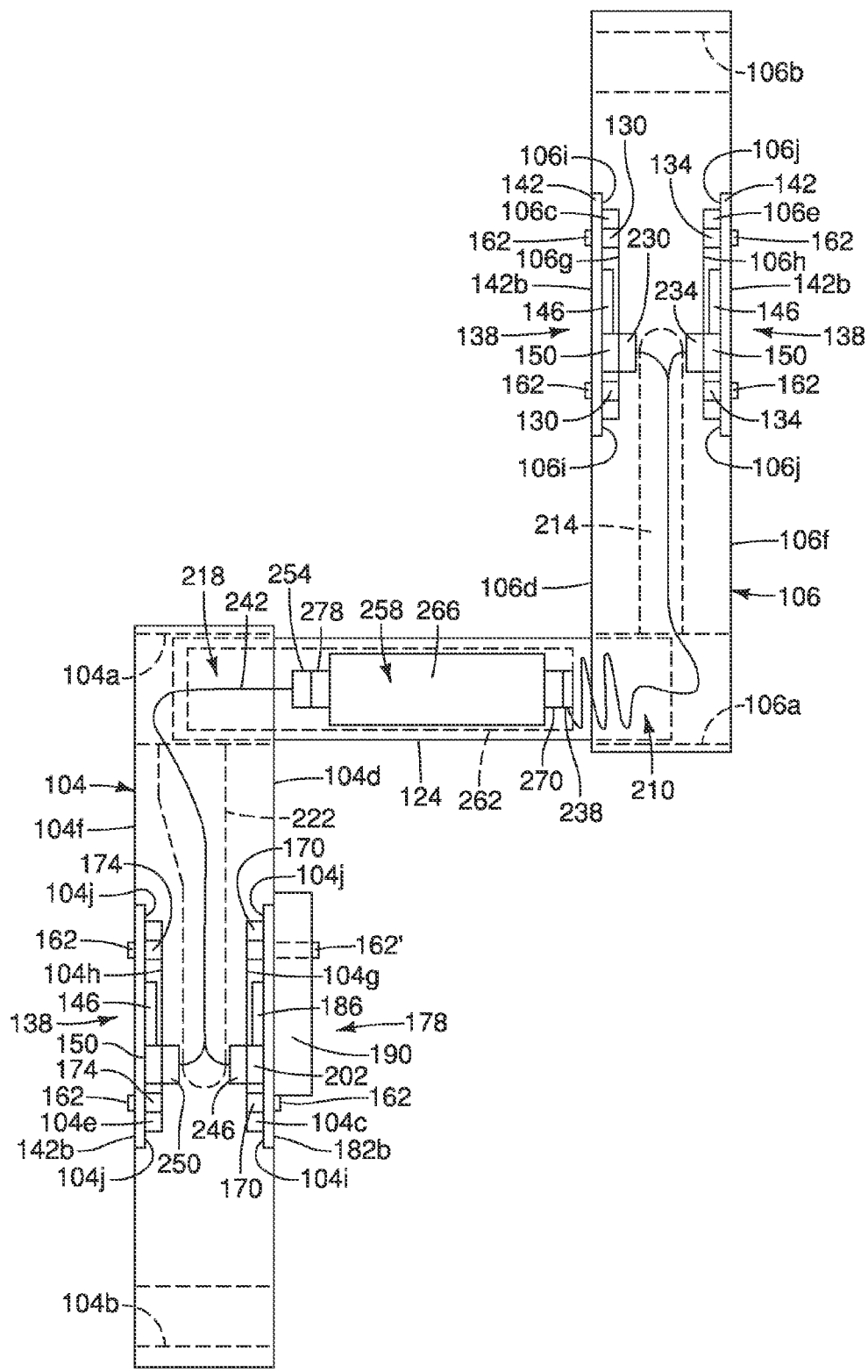
FIG. 14 is another schematic view of an alternate bicycle crank assembly for use with the bicycle illustrated in FIG. 11 in which the bicycle crank assembly has a measurement board mounted to each of the crank arms and a power source mounted to the crank axle.

As shown in FIG. 14, each of the measurement boards 138 can be detachably mounted to its corresponding one of the first or second circuit-mounting structures 130 or 134 using threaded fasteners such as screws 162 that extend through the mounting openings 158 in the substrate 142 and into their corresponding one of the first or second circuit-mounting structures 130 or 134. If desired, the first and second circuit-mounting openings 106c and 106e can have stepped portions 106i and 106j so that the measurement boards 138 are disposed within their respective one of the mounting openings 106c and 106e, and the bottom surfaces 142b of the measurement boards 138 are flush with their corresponding inner side surface 106d and outer side surface 106f of the crank arm 106. As shown in FIG. 13, a detachable cover 166 can cover the first and second circuit-mounting openings 106c and 106e when the measurement board 138 is not mounted in a corresponding one of the first or second circuit-mounting opening 106c or 106e. In this embodiment, the mounting openings 106c and 106e can be sealed by their respective measurement boards 138.

As shown in FIG. 13, in this embodiment, a first circuit-mounting opening 104c is formed at a laterally inner side surface 104d of the crank arm 104, and a second circuit-mounting opening 104e is for at a laterally outer side surface 104f of the crank arm 104. The first circuit-mounting opening 104c and the second circuit-mounting opening 104e include respective bottom floors 104g and 104h so that the first circuit-mounting opening 104c and the second circuit-mounting opening 104e are formed as recesses in the laterally inner side surface 104d and the laterally outer side surface 104f, respectively. The crank arm 104 includes two first circuit-mounting structures 170 that are disposed within the first circuit-mounting opening 104c. The crank arm 104 includes two second circuit-mounting structures 174 that are disposed within the second circuit-mounting opening 104e. However, the first and second circuit-mounting structures 170 and 174 may each be formed as continuous, one-piece structures with the crank arm 104, or they may be separate structures welded to or otherwise bonded or fastened to the crank arm 104. In this embodiment, as with the first and second circuit-mounting structures 130 and 134 in the crank arm 106, the first and second circuit-mounting structures 170 and 174 are structured as cylindrical pillars or some other forms of projections or protuberances with further circuit-mounting openings 170a and 174a containing further circuit-mounting structures in the form of threads 170b and 174b.

As shown in FIG. 14, the first circuit-mounting structures 170 are configured to detachably mount a measurement board 178 (FIG. 16) to the laterally inner side surface 104d of the crank arm 104 at the first circuit-mounting opening 104c. Likewise, the second circuit-mounting structures 174 are configured to detachably mount the measurement board 138, previously-described, to the laterally outer side surface 104f of the crank arm 104 at the second circuit-mounting opening 104e.

Figure 16:
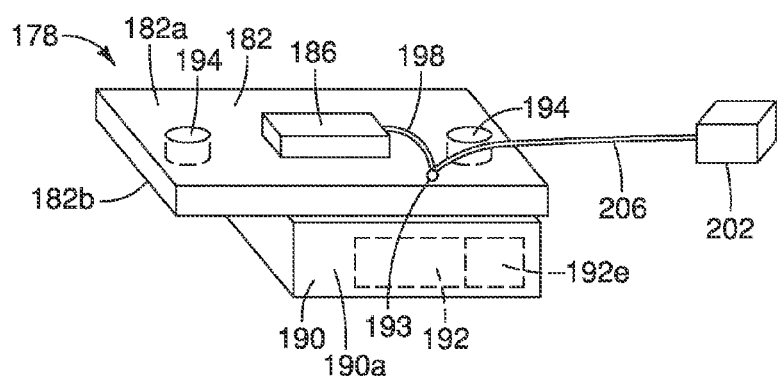
FIG. 16 is a perspective view of another embodiment of a measurement board with an attached control and communication circuit.

As shown in FIG. 16, the measurement board 178 can comprise a substrate 182 having a top surface 182a and a bottom surface 182b, a sensor 186 disposed at top surface 182a for measuring an input force, a control and communication part 190 mounted to bottom surface 182b, and a pair of mounting openings 194 in the form of through holes. A similar through hole (not shown) that aligns with the right-side mounting opening 194 is disposed in the control and communication part 190. The control and communication part 190 comprises a housing 190a and a control and communication circuitry 192 inside a housing 190a. The housing 190a can be made of resin to facilitate the transmission of electromagnetic waves therethrough. The control and communication part 190 can be disposed on top surface 182a of substrate 182, in which case substrate 182 or the crank arm 104 can be made of a non-metallic material, or the control and communication part 190 can be disposed on the bottom surface 182*b* of the substrate 182.

As with the measurement board 138, the substrate 182 may be a printed circuit board or a semiconductor that is a metal or other conductive or nonconductive rigid or flexible sheet. The sensor 186 comprises a strain gauge (e.g., a plurality of resistors configured as a Wheatstone bridge) that can be affixed to substrate 182 or formed as part of substrate 182. The sensor 186 can be formed at least in part from a semiconductor material to detect the strain on the substrate 182. The sensor 186 is operatively coupled to the control and communication part 190 through the wiring 198, and an electrical connector 202 is electrically connected to the control and communication part 190 through the wiring 206. The wiring 198 and 206 pass through a through-hole 193 in the substrate 182.

The control and communication circuitry 192 preferably includes a microprocessor that is programmed to calculate force or power applied to crank arms 82 and 86 in a well-known manner based on the signals received from sensors 146 and 186. The control and communication circuitry 192 also includes a transmitter 192*a* to transmit sensor signals and/or calculated data wirelessly to the cycle computer 120.

As shown in FIG. 14, the measurement board 178 can be detachably mounted to the first circuit-mounting structures 170 using threaded fasteners such as screws 162 that extend through the mounting openings 194 in the substrate 182 (as well as through the aligned openings in the control and communication part 190) and into the first circuit-mounting structures 170. Also the measurement board 138 can be detachably mounted to the second circuit-mounting structures 174 using threaded fasteners such as screws 162 that extend through the mounting openings 158 in the substrate 142 and into the second circuit-mounting structures 174 as illustrated. If desired, the first and second circuit-mounting openings 104*c* and 104*e* can have respective stepped portions 104*i* and 104*j* so that the measurement boards 178 and 138 are disposed within c respective mounting openings 104*c* and 104*e*, and the bottom surfaces 182*b* and 142*b* of The sensor respective measurement boards 178 and 138 are flush with their corresponding inner and outer side surfaces 104*d* and 104*f* of the crank arm 104. As shown in FIG. 13, the detachable covers 166 can cover the first and second circuit-mounting openings 104*c* and 104*e* when the measurement board 178 or 138 is not mounted at its corresponding one of the first or second circuit-mounting opening 104*c* or 104*e*.

As shown in FIGS. 13 and 14, a first wiring harness 210 is disposed at least partially within a hollow chamber 214 in the crank arm 106, and a second wiring harness 218 is disposed at least partially within a hollow chamber 222 in the crank arm 104. The first wiring harness 210 comprises a wiring bundle 226, a first electrical connector 230, a second electrical connector 234 and a third electrical connector 238. In this embodiment, the first electrical connector 230 is rigidly mounted to the bottom floor 106*g* of the first circuit-mounting opening 106*c* so as to be exposed to the first circuit-mounting opening 106*c*, and the second electrical connector 234 is rigidly mounted to the bottom floor 106*h* of the second circuit-mounting opening 106*e* so as to be exposed to the second circuit-mounting opening 106*e*. The electrical connector 150 of the measurement board 138 at the first circuit-mounting opening 106*c* is connected to the first electrical connector 230, and the electrical connector 150 of the measurement board 138 at the second circuit-mounting opening 106*e* is connected to the second electrical connector 234. If desired, the first electrical connector 230 and the second electrical connector 234 may form the first and second circuit-mounting structures alone or in combination with their respective first and second circuit-mounting structures 130 and 134, especially if one or both of the electrical connectors 150 are rigidly mounted to their corresponding substrates 142. The hollow chamber 214, the first circuit-mounting opening 106*c* and the second circuit-mounting opening 106*e* may be in fluid communication with each other (i.e., form a continuous opening).

Similarly, the second wiring harness 218 comprises a wiring bundle 242, a first electrical connector 246, a second electrical connector 250 and a third electrical connector 254. In this embodiment, the first electrical connector 246 is rigidly mounted to the bottom floor 104*g* of the first circuit-mounting opening 104*c* so as to be exposed to the first circuit-mounting opening 104*c*, and the second electrical connector 250 is rigidly mounted to the bottom floor 104*h* of the second circuit-mounting opening 104*e* so as to be exposed to the second circuit-mounting opening 104*e*. The electrical connector 202 of the measurement board 178 at the first circuit-mounting opening 104*c* is connected to the first electrical connector 246, and the electrical connector 150 of the measurement board 138 at the second circuit-mounting opening 104*e* is connected to the second electrical connector 250. If desired, the first electrical connector 246 and the second electrical connector 250 may form first and second circuit-mounting structures alone or in combination with their respective first and second circuit-mounting structures 170 and 174, especially if the electrical connector 202 is rigidly mounted to its corresponding substrate 182 and/or if the electrical connector 150 is rigidly mounted to its corresponding substrate 142. The hollow chamber 222, the first circuit-mounting opening 104*c* and the second circuit-mounting opening 104*e* may be in fluid communication with each other (i.e., form a continuous opening).

Figure 17:
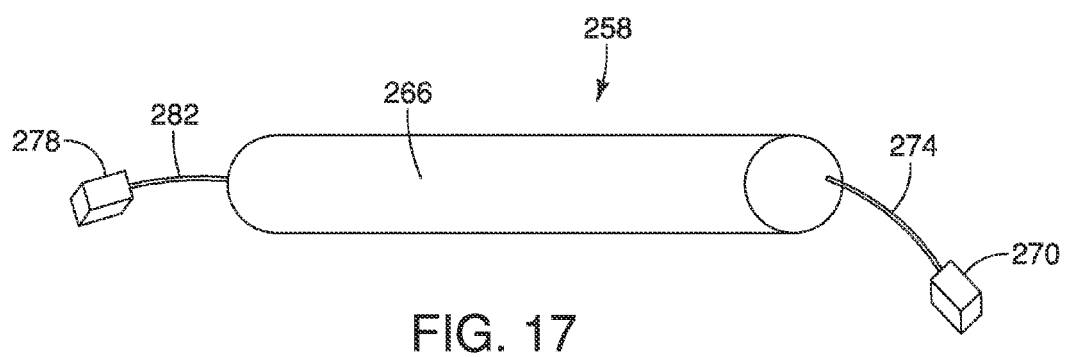
FIG. 17 is a perspective view of a particular embodiment of a power source.

As shown in FIGS. 14 and 17, a power source such as a battery unit 258 is disposed within a hollow chamber 262 in the crank axle 124. The battery unit 258 comprises a cylindrical battery housing 266 that houses a plurality of individual battery cells (not shown). A first electrical connector 270 is coupled to the battery housing 266 through wiring 274. A second electrical connector 278 is coupled to the battery housing 266 through wiring 282. The first electrical connector 270 is connected to the third electrical connector 238 of the first wiring harness 210 for communicating operating power to the measurement boards 138 at the first and second circuit-mounting openings 106*c* and 106*e* of the right crank arm 106 and for communicating sensor signals from the sensors 146 on the measurement boards 138 at the first and second circuit-mounting openings 106*c* and 106*e* through bypass wiring (not shown) in the battery housing 266. The second electrical connector 278 is connected to the third electrical connector 254 of the second wiring harness 218 for communicating operating power to the measurement boards 178 and 138 at the first and second circuit-mounting openings 104*c* and 104*e* of the left crank arm 104 and for communicating sensor signals from the sensors 146 on the measurement boards 138 at the first and second circuit-mounting openings 106*c* and 106*e* of the right crank arm 106 to the control and communication part 190. The wiring harness 218 also communicates sensor signals from the sensor 146 on the measurement board 138 at the second circuit-mounting opening 104*e* of the left crank arm 104 to the control and communication part 190.

Figure 18:
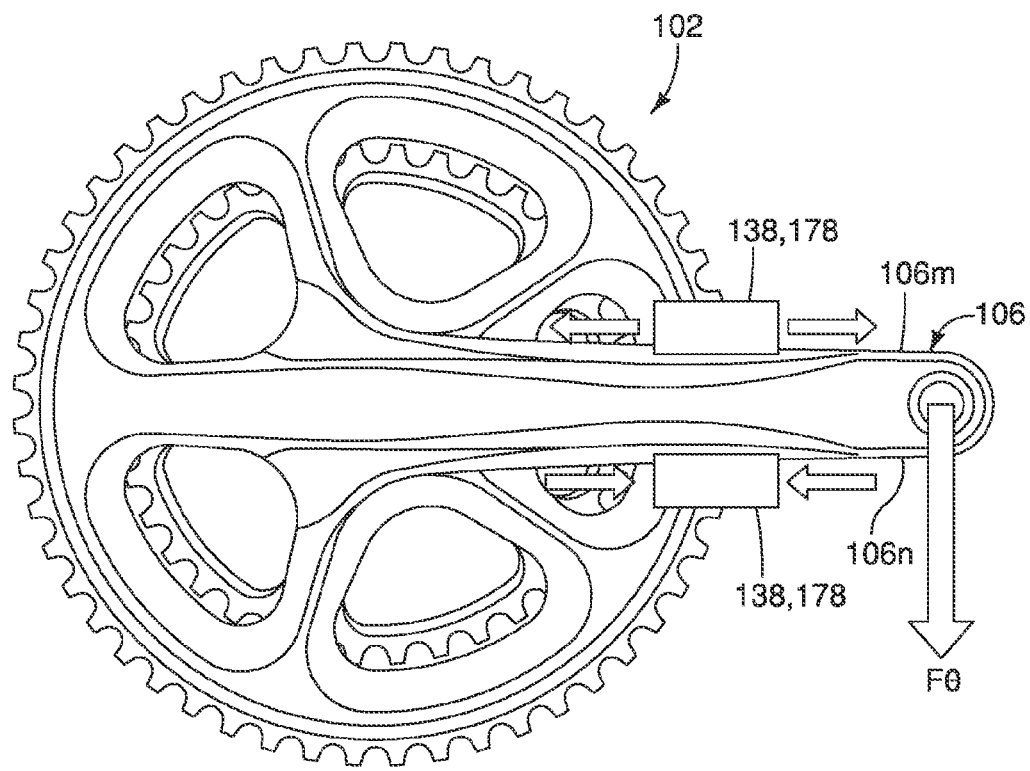
FIG. 18 is a schematic view of measurement board placement to measure a driving torque.
Figure 19:
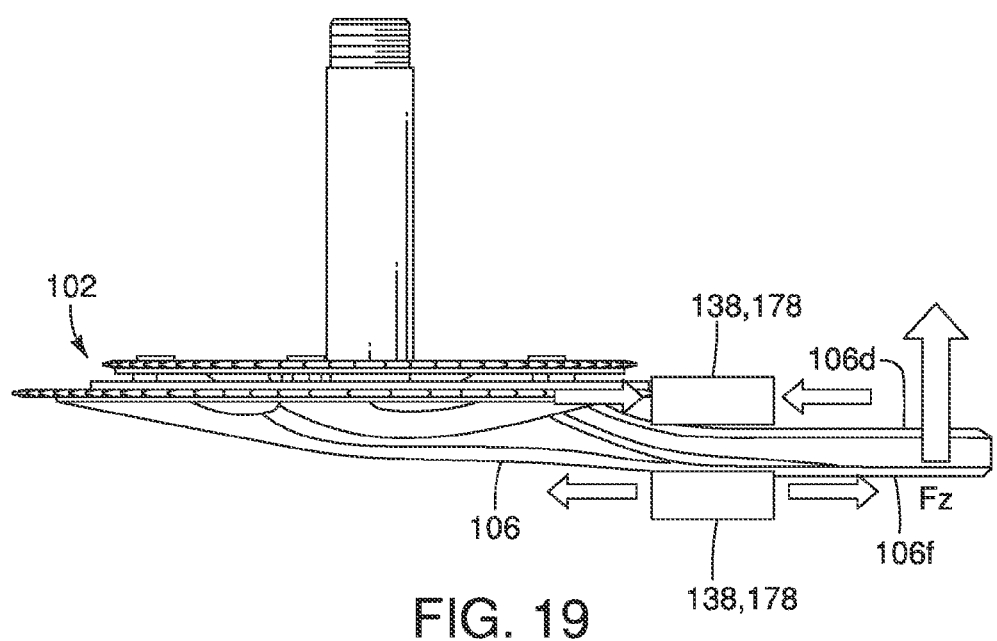
FIG. 19 is a schematic view of measurement board placement to measure an out-of-plane force.
Figure 20:
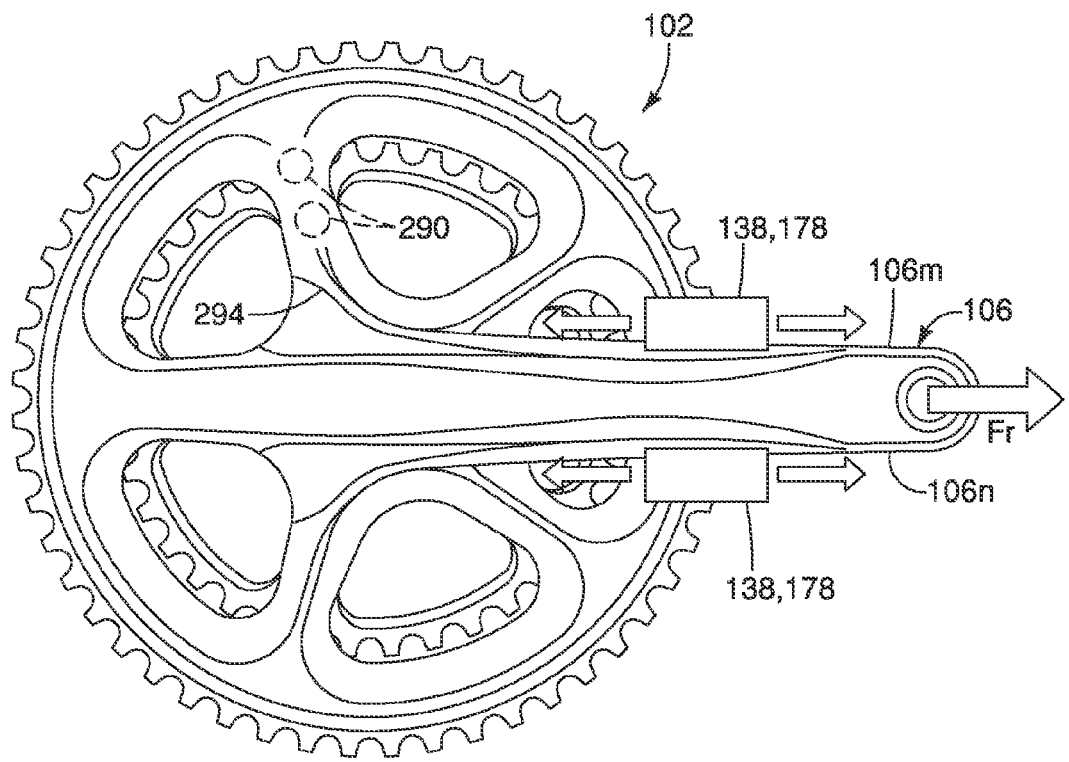
FIG. 20 is a schematic view of measurement board placement to measure a radial force.
Figure 21:
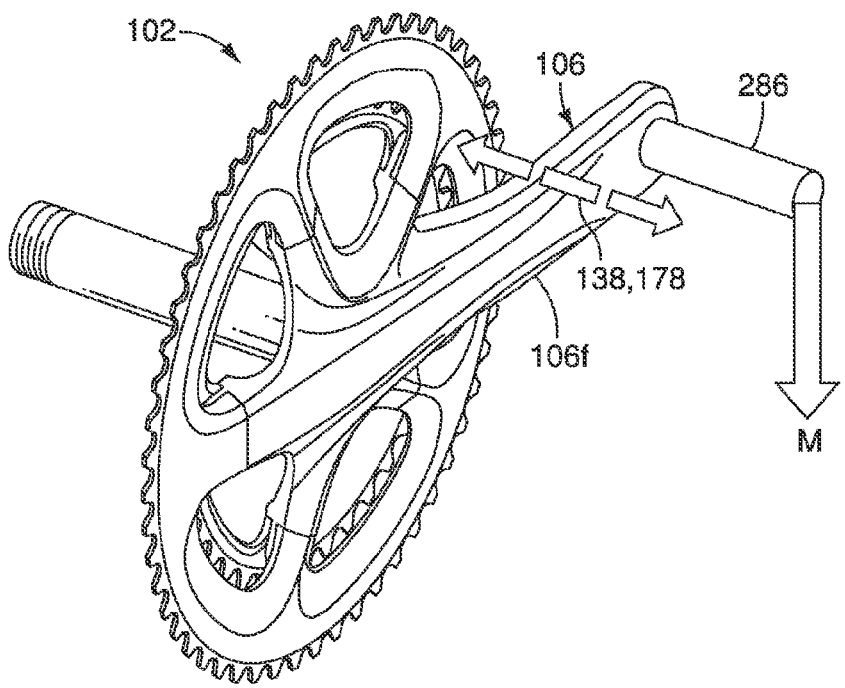
FIG. 21 is a schematic view of measurement board placement to measure a torsional moment force.

The sensor mounting arrangements disclosed herein have many uses. For example, as shown in FIG. 18, a driving torque Fθ may be detected and processed by the mounting measurement boards 138 (or 178) as shown on upper and lower side surfaces 106*m* and 106*n* of the crank arm 106 so that the sensor mounted on upper side surface 106*m* detects tension (indicated by arrows) and the sensor mounted on the lower side surface 106*n* detects compression. As shown in FIG. 19, the out-of-plane forces Fz may be detected and processed by the mounting measurement boards 138 (or 178) as shown on the laterally inner and outer side surfaces 106*d* and 106*f* of the crank arm 106 so that the sensor mounted on the inner side surface 106*d* detects compression and the sensor mounted on the outer side surface 106*f* detects tension (or vice versa). As shown in FIG. 20, the forces Fr directed radially outwardly along the longitudinal axis of the crank arm 106 may be detected and processed by the mounting measurement boards 138 (or 178) as shown on upper and lower side surfaces 106*m* and 106*n* of the crank arm 106 so that the sensor mounted on upper side surface 106*m* detects tension and the sensor mounted on the lower side surface 106*n* detects compression. As shown in FIG. 21, torsional moment forces M (caused by a pedal axle 286) may be detected and processed by mounting the measurement board 138 (or 178) diagonally as shown on the laterally outer side surface 106*f* of the crank arm 106 to detect diagonally-oriented tensile forces.

Alternatively, while the first and second wiring harnesses 210 and 218 were disposed within the hollow chambers 214 and 222 of the crank arms 106 and 104, respectively, the first and second wiring harnesses 210 and 218 could be molded directly into the corresponding the first and second crank arms 106 or 104. Alternatively, the first and second wiring harnesses 210 and 218 could be partially or entirely disposed outside of the first and second crank arms 106 and 104, and the connectors 150 and 202 need not be rigidly affixed to the bottom floors of their respective circuit-mounting openings. Likewise, the battery unit 258 could be disposed partially or entirely outside of the crank axle 124.

The circuit mounting openings 106*c*, 106*e*, 104*c* and 104*e* may be omitted, and the measurement boards 138 and/or 178 may be mounted to circuit mounting structures such as protuberances, circuit mounting structures (e.g., threads) disposed in circuit mounting openings at the side of the crank arm, circuit mounting structures disposed at connectors mounted to the crank arm, etc. While the measurement boards 138 and/or 178 were mounted to the right crank arm 106 and/or the left crank arm 104, the measurement boards 138 and/or 178 may be mounted to any such the circuit mounting structures 290 (FIG. 19), with or without corresponding recesses, disposed on a sprocket mounting arm (spider arm) 294 associated with the right crank arm 106. While the measurement boards 138 and 178 were illustrated with one of the the sensors 146 and 186 each, the measurement boards 138 and 178 can include multiple sensors each.

While only selected embodiments have been chosen to illustrate the present invention, it will be apparent to those skilled in the art from this disclosure that various changes and modifications can be made herein without departing from the scope of the invention as defined in the appended claims. Also for example, the size, shape, location or orientation of the various components can be changed as needed and/or desired if it does not substantially change its intended purpose. Components that are shown directly connected or contacting each other can have intermediate structures disposed between them. The functions of one element can be performed by two, and vice versa as needed and/or desired if it does not substantially change its intended purpose. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank arm comprising:
a crank body including a crank axle mounting portion and a pedal mounting portion;
a sensor support member disposed in a cavity of the crank body and attached to the crank body, the sensor support member being configured to deform upon application of a pedaling force being applied to the pedal mounting portion; and
a power sensing device supported on the sensor support member.

2. The bicycle crank arm according to claim 1, wherein the sensor support member is non-detachably fixed to the crank body.

3. A bicycle crank arm comprising:
a crank body including a crank axle mounting portion and a pedal mounting portion,
a sensor support member disposed in a cavity of the crank body and attached to the crank body; and
a power sensing device supported on the sensor support member,
an end surface of one of the crank axle mounting portion and the pedal mounting portion including an access bore that communicates with the cavity of the support body, the access bore being dimensioned with respect to the sensor support member such that the sensor support member is installed into the cavity via the access bore.

4. The bicycle crank arm according to claim 3, wherein the sensor support member includes a first portion that is fixed within a section of the access bore.

5. The bicycle crank arm according to claim 4, wherein the sensor support member includes a second portion that has a maximum width that is equal to or less than a maximum width of the first portion of the sensor support member.

6. A bicycle crank arm comprising:
a crank body including a crank axle mounting portion and a pedal mounting portion;
a sensor support member disposed in a cavity of the crank body and attached to the crank body, the sensor support member including a first portion in contact with the crank body at a first location and a second portion in contact with the crank body at a second location that longitudinally spaced apart from the first location with respect to a longitudinal axis of the crank body; and
a power sensing device supported on the sensor support member.

7. The bicycle crank arm according to claim 6, wherein the power sensing device supported on an intermediate portion of the sensor support member that is disposed between the first and second portions of the sensor support member.

8. A bicycle crank arm comprising:
a crank body including a crank axle mounting portion and a pedal mounting portion;
a sensor support member disposed in a cavity of the crank body and attached to the crank body; and
a power sensing device supported on the sensor support member, the power sensing device including a plurality of sensor elements disposed at different angular locations with respect to a longitudinal axis of the crank body.

9. The bicycle crank arm according to claim 8, wherein
the intermediate portion of the sensor support member has a rectangular transverse cross section with respect to the longitudinal axis of the crank body that defines four side surfaces, and
the sensor elements are arranged on at least two of the side surfaces of the intermediate portion of the sensor support member that are perpendicular to each other.

10. The bicycle crank arm according to claim 9, wherein
the sensor elements are arranged on each of the side surfaces of the intermediate portion of the sensor support member.

11. The bicycle crank arm according to claim 10, wherein the sensor elements are formed of at least one of a strain gauge and semiconductor sensor for detection of strain.

12. The bicycle crank arm according to claim 1, wherein the crank body includes a base member and a cover member attached to the base member to substantially enclose the cavity.

13. The bicycle crank arm according to claim 1, wherein the sensor support member is fixed to internal sides of the cavity of the crank body.

14. The bicycle crank arm according to claim 13, wherein the crank body includes a base member and a cover member attached to the base member to substantially enclose the cavity.

15. The bicycle crank arm according to claim 14, wherein the sensor support member is fixed to the internal sides of the cavity of the crank body that are formed by the base member.

16. The bicycle crank arm according to claim 1, further comprises
a communication unit operatively connected to the power sensing device to receive a signal from the power sensing device and outputs information based on the signal from the power sensing device.

17. The bicycle crank arm according to claim 16, wherein the communication unit wirelessly transmits the information.

18. A bicycle crank assembly including the bicycle crank arm according to claim 16, the bicycle crank assembly further comprising:
a crank axle having a first end fixed to the crank axle mounting portion; and
an additional bicycle crank arm including an additional crank body that is fixed to a second end of the crank axle, an additional sensor support member that is disposed in a cavity of the additional crank body, and an additional power sensing device that is supported on the additional sensor support member and operatively connected to the communication unit.

19. The bicycle crank assembly according to claim 18, further comprising
a battery unit disposed in the crank axle and electrically connected to the communication unit.

\* \* \* \* \*